(12) United States Patent
Thompson

(10) Patent No.: US 7,540,456 B2
(45) Date of Patent: Jun. 2, 2009

(54) MOUNTING DEVICE

(75) Inventor: Craig Thompson, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 243 days.

(21) Appl. No.: 11/271,324

(22) Filed: Nov. 10, 2005

(65) Prior Publication Data

US 2007/0102601 A1 May 10, 2007

(51) Int. Cl.
*A47G 1/17* (2006.01)
(52) U.S. Cl. .......... 248/205.3; 248/205.1; 248/220.21; 248/220.22; 248/222.52; 211/87.01; 211/105.1
(58) Field of Classification Search .............. 248/205.1, 248/205.3, 223.3, 223.31, 220.21, 220.22, 248/222.52, 224.51, 223.41; 211/89, 87.01, 211/105.1; 403/407.1, 384
See application file for complete search history.

(56) References Cited

U.S. PATENT DOCUMENTS

| | | | |
|---|---|---|---|
| 2,299,443 A | 10/1942 | Walmsley | |
| 2,530,892 A | 11/1950 | Mayo | |
| 3,848,843 A | 11/1974 | Levy | |
| 3,861,639 A | 1/1975 | Morrill | |
| 4,024,312 A | 5/1977 | Korpman | |
| 4,083,525 A | 4/1978 | Rath | |
| 4,340,199 A | 7/1982 | Brock | |
| 4,437,639 A | 3/1984 | Stein | |
| 4,446,642 A | 5/1984 | Chap | |
| 4,450,980 A | 5/1984 | Clabby et al. | |
| 4,826,119 A * | 5/1989 | Gresens et al. | 248/223.31 |
| 4,923,159 A | 5/1990 | Wang et al. | |
| D348,386 S | 7/1994 | Cogburn | |
| 5,346,077 A | 9/1994 | Randall | |
| 5,402,977 A * | 4/1995 | Korfgen et al. | 248/309.1 |
| 5,507,464 A * | 4/1996 | Hamerski et al. | 248/683 |
| 5,516,581 A | 5/1996 | Kreckel et al. | |
| 5,605,313 A | 2/1997 | Erickson et al. | |
| 5,743,756 A * | 4/1998 | Hasz et al. | 439/364 |
| 5,758,851 A * | 6/1998 | Remmers | 248/251 |
| 5,893,544 A * | 4/1999 | Chen | 248/220.21 |
| 6,053,468 A | 4/2000 | Francis | |
| 6,189,489 B1 * | 2/2001 | Pearce | 119/477 |
| 6,220,460 B1 * | 4/2001 | Pan | 211/87.01 |
| 6,231,962 B1 | 5/2001 | Bries et al. | |
| 6,241,210 B1 | 6/2001 | Brindisi | |
| 6,299,001 B1 | 10/2001 | Frolov et al. | |
| 6,494,653 B2 | 12/2002 | Remmers | |
| D484,778 S | 1/2004 | French | |
| D485,745 S | 1/2004 | Sung | |
| 6,719,260 B1 | 4/2004 | Hart | |

(Continued)

FOREIGN PATENT DOCUMENTS

AU 718053 4/2000

(Continued)

*Primary Examiner*—J. Allen Shriver
*Assistant Examiner*—Todd M. Epps
(74) *Attorney, Agent, or Firm*—Kenneth B. Wood

(57) ABSTRACT

A device for mounting an item on a surface includes a base plate having front and rear major surfaces, a fastener for securing the base plate to the surface, and a retaining member removably connected with the base plate front major surface to retain the item on the device.

18 Claims, 4 Drawing Sheets

U.S. PATENT DOCUMENTS

| | | | |
|---|---|---|---|
| 6,729,591 B2 * | 5/2004 | Hsu | 248/205.6 |
| 6,957,926 B2 * | 10/2005 | Okuda | 403/374.3 |
| 6,983,918 B1 * | 1/2006 | Leasure | 248/311.2 |
| 2003/0038222 A1 | 2/2003 | Holmes | |

FOREIGN PATENT DOCUMENTS

| | | |
|---|---|---|
| AU | 776381 | 6/2001 |
| DE | 33 31 016 | 7/1992 |
| FR | 2 422 369 | 11/1979 |
| FR | 2 606 844 | 5/1988 |
| JP | 05-228045 A | 9/1993 |
| JP | 03-083361 U | 10/2001 |
| JP | 3-100722 U | 1/2004 |
| KR | 20-0289258 Y1 | 9/2002 |

* cited by examiner

MOUNTING DEVICE

BACKGROUND

The present invention relates generally to mounting devices and, more particularly, to a mounting device that can be used to securely attach an article, particularly an article formed of rigid wire rods, to a surface using, for example, a stretch releasing adhesive strip.

Many items are mounted on wall surfaces around the home and in the workplace. Such items include, for example, soap dishes, toothbrush holders, shower caddies, kitchen organizers, calendars, storage systems, shelves and organizers. Such items come in a wide variety of styles and sizes and come in plastic, wood laminate systems and wire-type systems. Wood laminate and wire-type systems are commercially available, for example, under the trade designation CLOSETMAID. Such storage systems and organizers may be designed to either stand alone but are commonly designed to be mounted or otherwise secured to a wall surface, such as on a wall, in a closet, or on the inside of a cabinet door.

Organizer systems that can be mounted on a wall are known in the patented prior art. U.S. Pat. No. 6,299,001 (Frolov), for example, discloses a wall organizer system formed of wire mesh panels that includes wall brackets for holding the mesh panels to the wall. U.S. Pat. No. 5,346,077 (Randall) discloses an assembly for a wire shelf including a cantilever bracket for mounting to a vertical wall support bracket.

Such systems are typically mounted using conventional mechanical fasteners, such as nails and screws, or require specially designed mounting hardware to anchor them to the wall surface. An example of such a special mechanical fastener is disclosed, for example, in U.S. Pat. No. 6,494,653 (Remmers), which discloses a mechanical wall anchor that can be used to hang an item, such as a wire shelf, on a wall.

Such conventional mounting hardware, however, suffers from certain drawbacks and limitations. Conventional mounting hardware, for example, is difficult to install, damages the wall surface upon installation, may require tools for installation, is fixed in place once mounted to the wall surface and therefore cannot be easily adjusted or moved to a new location once it has been installed, is generally designed for use with a specific type and/or size of organizer system, is difficult to remove from the wall surface, and typically requires the system to be installed at a fixed orientation, the orientation being determined by the installation of the mounting hardware.

Stretch releasing adhesive tapes and adhesive tape strips are a class of high performance pressure-sensitive adhesives combining strong holding power with clean removal and no surface damage. Stretch releasing adhesive tapes are useful in a wide variety of assembling, joining, attaching, and mounting applications. Stretch releasing adhesive strips are known in the patented prior art. U.S. Pat. No. 4,024,312 (Korpman), for example, discloses a highly conformable adhesive tape including a highly extensible and elastic backing film laminated with an adhesive layer. The adhesive strip is easily stretchable and may be removed from a surface by stretching the strip lengthwise in a direction substantially parallel to the surface.

German Patent No. 33 31 016 discloses a high elasticity, low plasticity adhesive film based on a thermoplastic rubber and tackifying resins, wherein the adhesive bond can be broken by stretching the adhesive film in the direction of the plane of the adhesive bond.

U.S. Pat. No. 5,516,581 (Kreckel et al.) discloses a removable adhesive strip having a highly extensible and substantially inelastic backing coated with a layer of pressure sensitive adhesive and a non-adhesive pull tab to facilitate stretch removal. The adhesive strip can be removed from most surfaces without damaging the substrate by grasping the non-adhesive pull tab and stretching the strip in a direction substantially parallel to the surface of the substrate.

U.S. Pat. No. 6,231,962 (Bries et al.) discloses a removable foam adhesive strip. The adhesive strip comprises a backing including a layer of polymeric foam and a layer of pressure-sensitive adhesive coated on at least one surface of the backing.

A commercially available stretch releasing adhesive tape strip is the product sold under the trade designation COMMAND by 3M Company, St. Paul, Minn.

A need exists for a versatile mounting device that is easy to install and use and may be used in place of mechanical fasteners, such as nails and screws, and in place of suctions cups. It would also be desirable to provide a mounting device that does not damage the wall surface, can be attached to a wall surface without the use of tools, can be easily moved from one location to another, allows a storage or organizing system to be mounted and removed from a wall surface quickly and easily, allows the storage or organizing system to be mounted at varying orientations, can be used to mount storage and organizing systems of different sizes, and allows the storage or organizing system itself to be installed without the use of tools. There is a particular need for a versatile mounting device for mounting so call wire-type storage and organizing systems (i.e. store and organizing systems constructed of rigid rods, typically formed of metal, and typically having a diameter of about 2 millimeter (mm) to about 10 mm).

SUMMARY

The present invention provides a device for mounting an item on a target surface. The device is particularly suited for mounting storage and organizing systems formed of rigid rods, and can be used in place of conventional mechanical fasteners and suction cups.

In one embodiment, the mounting device includes a base plate having front and rear major surfaces, the rear major surface including a fastener for securing the base plate to the target surface, and a retaining member connected with the base plate front major surface movable between an open position spaced from the base plate and a closed position adjacent the base plate. The fastener may be a conventional mechanical fastener such as a nail or screw, suction cups, or an adhesive, but is preferably a double-sided stretch releasable adhesive strip.

In one aspect of the invention, the retaining member includes a shaft portion and a head portion that extends outwardly from the shaft portion, and the head portion includes a contact surface for contacting the item being mounted as the retaining member is moved from the open position to closed position.

In more specific embodiments, the retaining member is rotatably connected with the base plate, and the retaining member is threadably connected with the base plate. In a particular embodiment, the retaining member and base plate include an internally threaded counter bore and a mating externally threaded fastening member.

In another embodiment, the retaining member includes a shaft portion and a rib portion extending outwardly from the shaft portion arranged to retain the mounted item on the device between the front major surface of the base plate and the retaining member, thereby securely retaining the item on the device.

In another aspect, the mounting device includes a cover plate arranged over at least a portion of the base plate. The cover plate contains a central opening at the location where the retaining member connects with the base plate. The cover plate preferably attaches to the base plate. This may be accomplished, for example, with a snap-type connection.

In another embodiment, the front surface of the base plate contains a channel for receiving the item being mounted. In another aspect, the base plate includes at least one raised abutment for maintaining the item in a fixed position relative to the abutment. In a more particular aspect, the abutment includes an inclined surface. In a specific embodiment, the abutments include a central abutment and at least one secondary abutment spaced from the central abutment. In an even more specific embodiment, the base plate includes a plurality of secondary abutments arranged at regular spaced intervals around the central abutment.

In another aspect, the mounting device includes an adhesive strip arranged along the rear surface of the base plate. In a more specific aspect, the adhesive strip is a stretch releasing strip including a non-adhesive pull tab that extends outwardly beyond the perimeter of the base plate.

BRIEF DESCRIPTION OF THE DRAWINGS

The present invention will be further described with reference to the accompanying drawings, in which.

DETAILED DESCRIPTION

Figure 1:
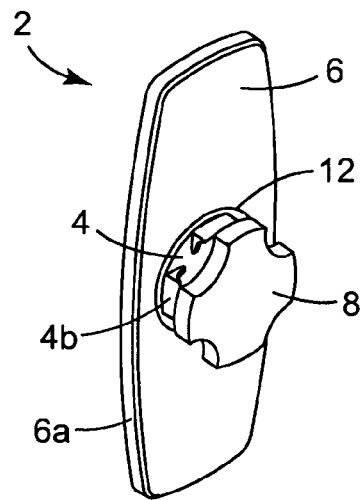
FIG. 1 is a perspective view of the mounting device according to the invention.
Figure 2:
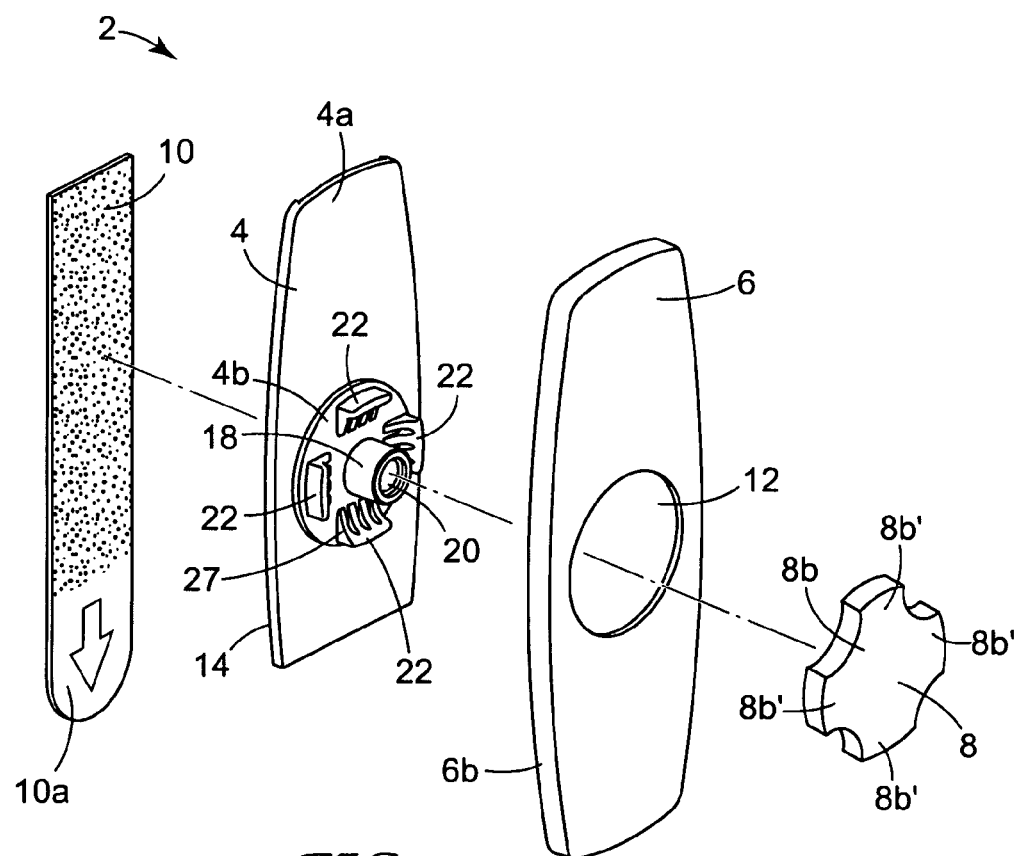
FIG. 2 is an exploded perspective view of the mounting device of FIG. 1.
Figure 3:
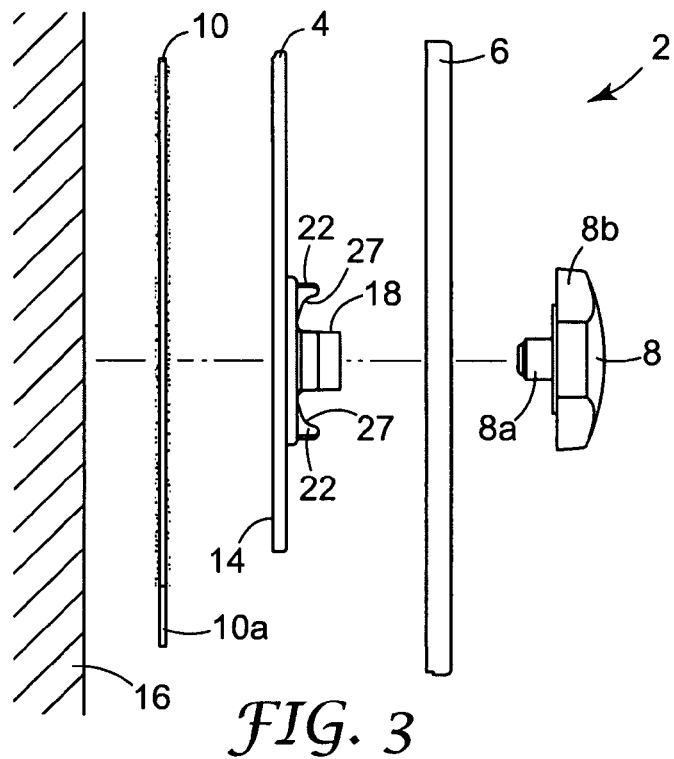
FIG. 3 is an exploded side view of the mounting device attached to a wall surface with an adhesive strip.
Figure 4:
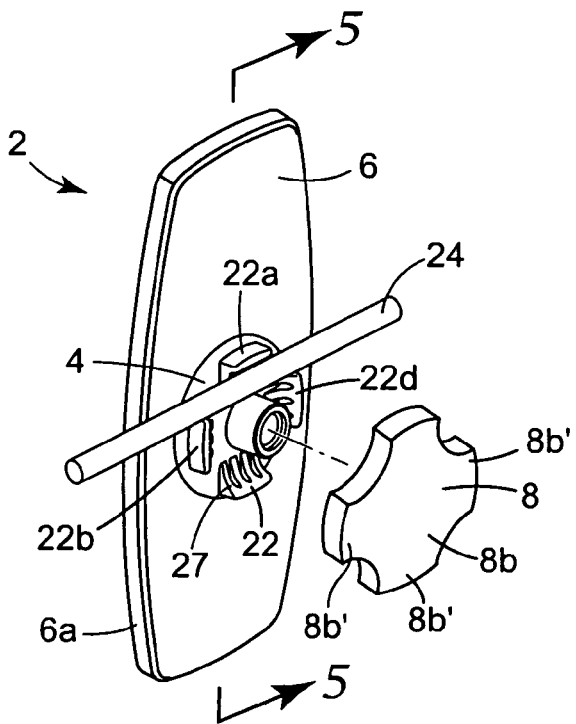
FIG. 4 is a perspective view showing the mounting device being used to connect a wire rod to a surface.
Figure 5:
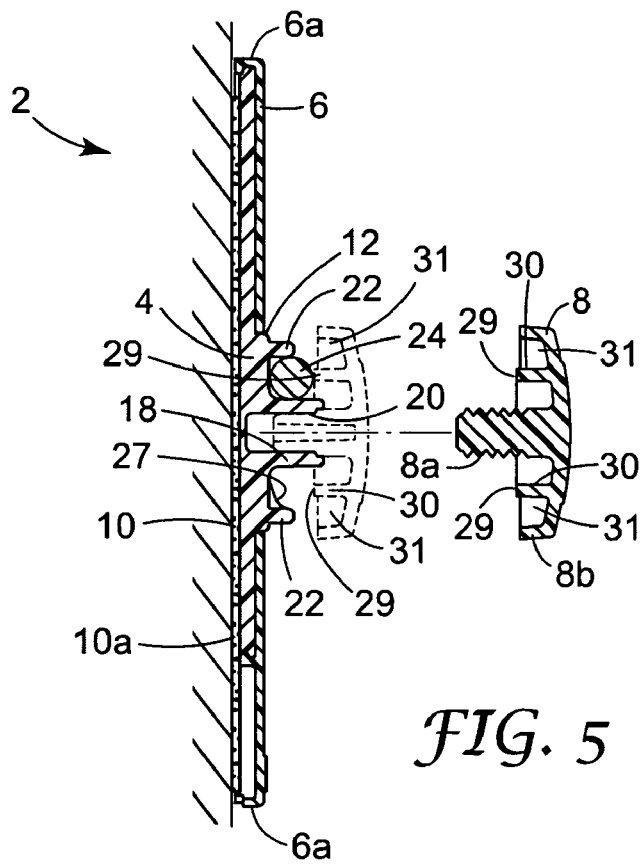
FIG. 5 is a cross sectional view taken along line 5-5 of FIG. 4.
Figure 6:
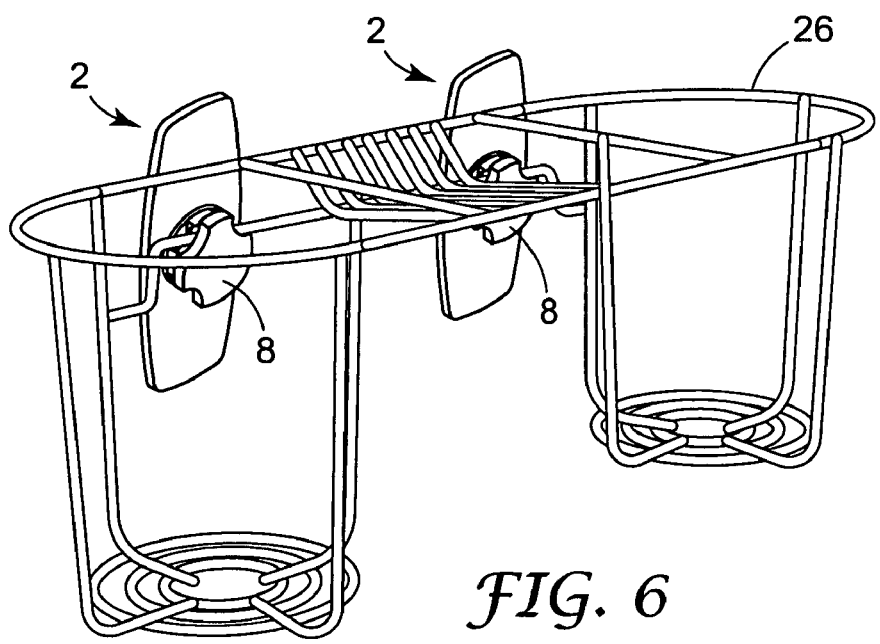
FIG. 6 is a perspective view of a wire-type storage system mounted to a surface with the mounting device.

Referring now to the drawings, wherein like reference numerals refer to like or corresponding parts throughout the several views, FIGS. 1-6 show an embodiment of a mounting device 2 according to the invention. FIG. 1 shows the mounting device 2 in its assembled condition, FIGS. 2 and 3 show the mounting device 2 in its disassembled or fully separated condition, and FIGS. 4-6 show the mounting device 2 being used to mount a wire-type article to a wall surface. In the illustrated embodiment, the mounting device 2 includes a base plate 4, a cover plate 6, a retaining member 8, and a double-sided adhesive strip 10.

The cover plate 6 is adapted to be arranged over the base plate 4, thereby to conceal at least a portion of the base plate 4. The cover plate 6 is also typically sized to overlay and, therefore, conceal any portion of the adhesive strip 10 that extends outwardly from behind the base plate 4, such as the non-adhesive pull tab 10a of the stretch releasing adhesive strip 10. It will be recognized that—although it may be desirable for certain end-use applications—the cover plate 6 may be omitted entirely and is not a necessary element of the mounting device 2.

The cover plate 6 is designed to connect with or otherwise attach to the base plate 4. This may be accomplished, for example, by a friction fit connection, a snap fit connection, or using other conventional connecting means. The cover plate 6 contains a central opening 12 through which a portion of the base plate 4 is exposed, thereby allowing the retaining member 8 to be connected directly with the base plate 4. In the illustrated embodiment, the central opening 12 is oval-shaped, but the central opening may also be a circle, square, triangle or any other desired shape.

The cover plate 6 also includes a lip portion 6a extending around the perimeter of the cover plate 6. When the mounting device is assembled (i.e. when the base plate 4 and the cover plate 6 are connected), the lip portion 6a extends in overlapping relation around the base plate 4 and thereby conceals the edge of the base plate 4 from view when the mounting device 2 is mounted on a surface.

Alternatively, the cover 6 may be designed to cover the entire base plate 4, any portion of the adhesive strip 10 extending outwardly from behind the base plate 4, as well as the retaining member 8 and a portion of the mounted item attached to the mounting device 2. In this manner, the cover 6 comprises the entire facade of the device and could therefore be used to provide the device with a variety of styles or appearances. Such covers may also be interchangeable, thereby further enhancing the design flexibility of the device.

As shown most clearly in FIG. 2, the base plate 4 includes a back portion 4a and an optional, centrally-located, raised, front portion 4b that extends outwardly from the back portion 4a. The back portion 4a includes a generally planar rear surface 14 that allows the double-sided adhesive strip 10 to be firmly bonded to the base plate 4, which, in turn, allows the base plate 4 to be adhesively bonded to a wall surface 16 (FIG. 3).

The raised front portion 4b has a size and shape that generally corresponds to the size and shape of the central opening 12 in the cover plate 6, such that the front portion 4b of the base plate 4 fits through the cover plate central opening 12 when the cover plate 6 is arranged over the base plate 4. The raised front portion 4b serves to support the mounted item in front of the cover plate 6. That is, when assembled, the cover plate 6 is arranged behind the mounted item. In addition, the cover plate 6 is arranged in overlapping mating relation with the base plate 4 such that the cover plate 6 will not interfere with the mounting or placement of the mounted item on the base plate 4. That is, the mounted item cannot knock the cover plate 6 off the base plate 4, and the mounted item may be mounted at multiple orientations on the base plate because the cover plate 6 does not restrict the mounting orientation of the mounted item.

The raised front portion 4b of the base plate 4 includes a boss 18 containing an internally threaded counter bore 20 that allows the retaining member 8 to be connected with the base plate 4. To allow the retaining member 8 to be connected with the base plate 4, the counter bore 20 is positioned on the base plate 4, such that it is arranged within the central opening 12 of the cover plate 6 when cover plate 6 is placed over the base plate 4. Alternatively, the boss 18 may be omitted such that the counter bore 20 is formed directly into the base plate 4.

In accordance with one aspect of the invention, the raised front portion 4b of the base plate 4 includes a plurality of optional projections or abutments 22 that serve to maintain a mounted item 24 (illustrated in FIGS. 4 and 5 as a wire rod 24 that may form part of a larger article 26 such as a storage system as shown in FIG. 6) in a fixed position relative to the base plate 4. That is, the boss 18 and each abutment 22 together define the sides of a channel for receiving the wire rod 24. Alternatively, a channel for receiving a wire rod may be provided as a recess or groove formed directly into the top surface of the base plate 4 and the abutments 22 may be omitted.

In the illustrated embodiment, the base plate 4 includes four equally spaced abutments 22. More specifically, the abutments 22 are arranged at regular spaced intervals around the boss 18, one directly above the boss 18, one directly below the boss 18, and one on each side of the boss 18 at locations spaced equally between the other abutments 22. In addition, the side edges of each abutment 22 are aligned with the outer surface of the boss 18. That is, the width of each abutment 22 is generally equal to the width (i.e. diameter) of the boss 18. As shown in FIG. 4, when arranged and sized in this manner, when an elongate item such a wire rod 24 is mounted on the device 2, its movement will be restricted by the boss 18, the abutment 22a opposite the boss 18, and also by the side edges of the two abutments 24b, 22c located on opposite sides of the boss 18, thereby stabilizing the wire rod 24.

The illustrated arrangement of the central boss 18 and abutments 22 offers a number of advantages. For example, the illustrated arrangement allows a wire rod 24 to be positioned at different orientations relative to the mounting device 2. That is, the wire rod 24 may be arranged either horizontally or vertically on a vertical wall surface. In addition, the wire rod 24 may be arranged horizontally either above or below the boss 18, or may be arranged vertically either to the left or to the right side of the boss 18. The illustrated arrangement also allows the wire rod 24 to slide laterally relative to the mounting device (i.e. horizontally if the device 2 is mounted on a vertical wall surface). That is, the mounting device 2 allows for translational movement of the wire rod 24. The arrangement also allows for one degree of rotational movement of the wire rod 24 relative to the device. More particularly, the wire rod 24 may be rotated relative to the device 2 around its longitudinal axis such that the mounted item storage system 26 may be pivoted outwardly away from the surface on which it is mounted. Other rotational movement of the wire rod 24, however, is restricted.

When the device 2 is used with a wire-type storage system or organizer 26, each abutment 22 is spaced from the central boss by a distance to accommodate the particular size of the wire rod, typically about 2 mm to about 10 mm. To accommodate a range of rod sizes or diameters and to provide a more secure attachment of the wire rod 24 to the device 2, the abutments 22 optionally include a tapered or inclined inner surface 27 (i.e. the surface facing the central boss 18), such that the height of each abutment 22 increases in the direction away from the boss 18. The inclined surface 27 may be planar or curved. In this manner, as the retaining member 8 is tightened (i.e., moved in the direction of the base plate 4), the wire rod 24 is forced downwardly along the inclined surface and in the direction of the central boss 18, thereby securely attaching the rod 24 to the device 2 by locking the rod 24 in place against the boss 18.

In accordance with another aspect of the invention, the retaining member 8 is movably or adjustably connected with the base plate 4. That is, the retaining member 8 may be moved relative to the base plate 4 such that the retaining member 8 may be positioned close to the base plate 4 (e.g. near, adjacent to, or in abutting relation to the base plate 4), or the retaining member 8 may be positioned in spaced relation from the base plate 4. The retaining member 8 is also connected with the base plate 4 in a manner that allows the retaining member 8 to securely hold an item mounted with the mounting device 2. By connecting the base plate 4 and retaining member 8 in this manner, the mounting device 2 may be used to easily mount a variety of items securely, and allows the position of the mounted item to be easily adjusted or removed from the mounting device 2 when removal is desired.

In accordance with another aspect of the invention, the retaining member 8 may be separably, detachably or removably connected with the base plate 4. That is, the retaining member 8 may be repeatedly connected and disconnected with the base plate 4 without damaging the base plate 4 or retaining member 8. Removably connecting the retaining member 8 to the base plate 4 facilitates the installation and removal of an item from the mounting device 2.

In the illustrated embodiment, the retaining member 8 includes an externally threaded connecting portion 8a or shaft that rotatably connects with the internally threaded counter bore 20. The retaining member 8 can therefore be connected with the base plate 4 by threading the threaded portion 8a of the retaining member 8 into the counter bore 20. Alternatively, the internally threaded counter bore 20 and the externally threaded connecting portion 8a of the retaining member 8 may be reversed such that the base plate 4 includes an externally threaded connecting portion and the retaining member 8 includes an internally threaded counter bore.

Other connectors and connecting means between the base plate 4 and the retaining member 8 (i.e. in addition to threaded connections) are contemplated in connection with the present invention. The connection between the base plate 4 and retaining member 8 may be formed, for example, using a releasable snap connection, a friction fit connection, or other known connecting means that allow the retaining member 8 to be adjustably connected with the base plate 4.

The connection between the base plate 4 and the retaining member 8 need not provide a rotatable connection, but may be limited to axial movement between the retaining member 8 and the base plate 4. That is, the particular connection selected is not significant so long as it provides the desired function of allowing adjustable movement between the base plate 4 and retaining member 8, thereby allowing the retaining member 8 to be moved between a first position in the vicinity of the base plate 4 and a second position spaced from the base plate 4, and also provides for a secure connection between base plate 4 and retaining member 8 so that a mounted item may be securely retained by the mounting device 2.

The retaining member 8 also includes an optional handle portion 8b that facilitates manual actuation of the retaining member 8 by a user and also serves as a clamping member for retaining a mounted item. The handle portion 8b extends outwardly from the terminal end of the connecting portion 8a. In this manner, the handle portion 8b allows a user to more easily control and/or adjust the position of the retaining member 8 relative to the base plate 4. In the illustrated embodiment, this may be accomplished, for example, by rotating the retaining member 8 clockwise to move the handle portion 8b in the direction of the base plate 4, or rotating the retaining member 8 counterclockwise to move the handle portion 8b away from the base plate 4.

In addition, as shown in FIG. 5, the underside of handle portion 8b (i.e. the side facing the base plate 4 when the retaining member 8 is attached to the base plate 4) includes a raised contact surface 29 arranged to engage the wire rod 24 as the retaining member 8 is moved in the direction of the base plate 4, thereby to secure the wire rod 24 in place. In the illustrated embodiment, the contact surface 29 is the end surface of an annular ridge 30 that protrudes from the underside of the handle portion 8b. To allow the retaining member 8 to fit snuggly against the base plate 4, particularly if the device 2 is being used to mount a relatively small item such as a wire rod having a diameter that is less than the depth of the channel between the central boss 18 and an abutment 22, the underside of the handle portion 8b optionally includes a recessed region 31. The recessed region 31 may be an annular channel or groove configured to allow the terminal portion of the abutments 22 to extend into the recessed region 31 as the retaining member 8 is tightened, or the recessed region 31 may simply be a region set back from the ridge 30.

In the illustrated embodiment, the handle portion 8b includes optional rib portions 8b' that serve as clamping members, which, in combination with the boss 18 and abutments 22 serve to capture a mounted item 24 (FIG. 5), and thereby retain the item in a fixed position relative to the mounting device 2. In the illustrated embodiment, the rib portions 8b' extend radially outwardly from the threaded portion 8a of the retaining member 8 a distance approximately equal to the distance the abutments 22 are spaced from the boss 18. The handle portion 8b includes four rib portions 8b' arranged in cooperating relation with the four abutments 22.

Handle portions having other shapes are also contemplated in connection with the present invention. The handle portion 8b may be, for example, circular such that one continuous rib portion extends around the threaded portion. Alternatively, the handle portion 8b may be square, rectangular, oval or other geometric shapes. In addition, the rib portions 8b' may be provided in a variety of shapes and/or sizes.

The adhesive strip 10 may be a conventional double-sided adhesive tape but is more typically a stretch releasing adhesive strip. In the illustrated embodiment, the adhesive strip 10 is a stretch releasing adhesive strip including a non-adhesive pull tab 10a that extends downwardly beyond the bottom of the base plate 4. Suitable stretch releasing adhesive strips may include a pressure sensitive adhesive strip with an elastic backing, a pressure sensitive adhesive strip with a highly extensible and substantially inelastic backing, or a solid, elastic pressure sensitive adhesive. Specific stretch releasing adhesive strips suitable for use in the various embodiments of the present invention include the pressure sensitive adhesive strips with elastic backings described in U.S. Pat. No. 4,024,312 (Korpman), the pressure sensitive adhesive strips with highly extensible and substantially inelastic backings described in U.S. Pat. No. 5,516,581 (Kreckel et al.) and Bries et al. (6,231,962), and the solid, elastic pressure sensitive adhesive described in German Patent No. 33 31 016.

Alternatively, the base plate 4 may be mounted to a surface using conventional adhesives such as pressure-sensitive adhesives, glues, epoxies, and the like, may be mounted using conventional mechanical fasteners such as nails, screws, and the like, or may be mounted using suction cups.

Figure 7:
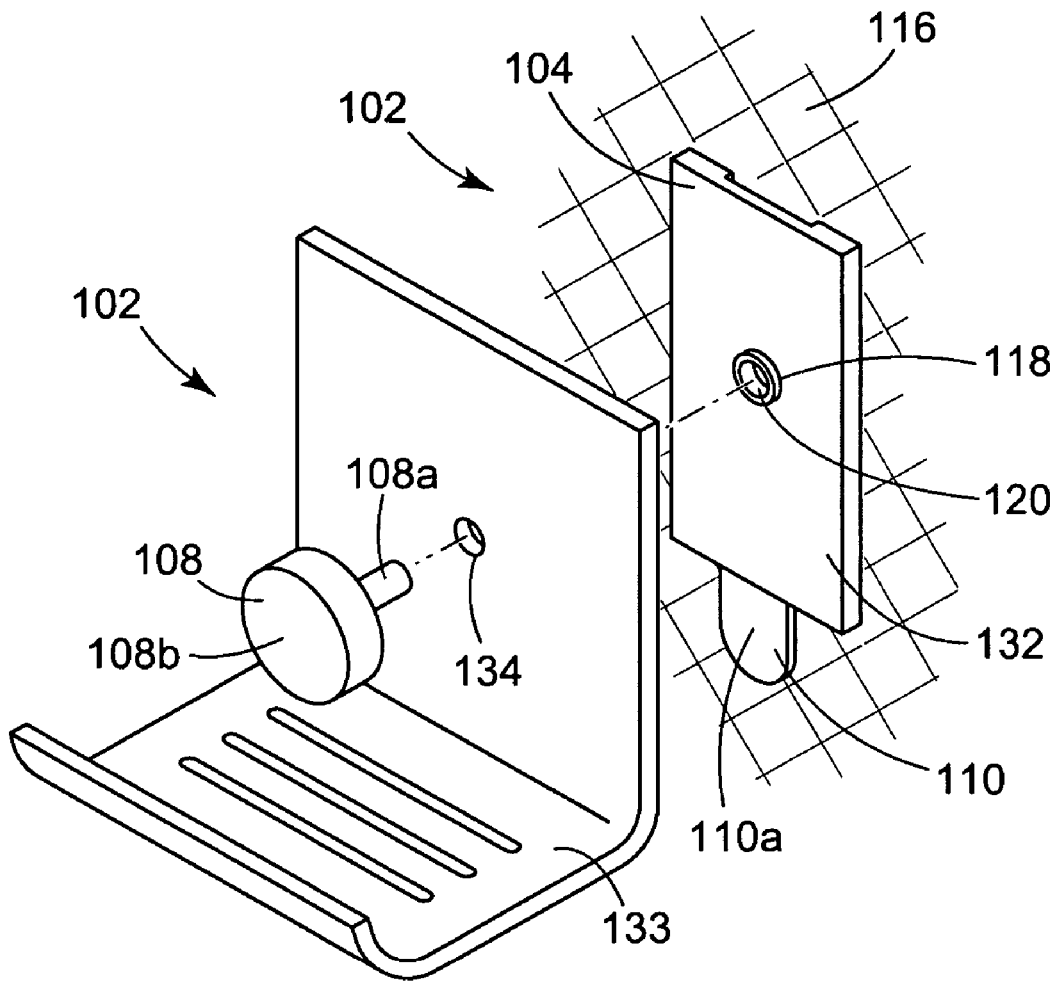
FIG. 7 is an exploded perspective view of an alternate embodiment of the invention being used to mount a soap dish to a surface.

FIG. 7 shows an alternate embodiment of the invention wherein functionally similar features are referred to with like reference numerals incremented by 100. In particular, FIG. 7 shows a soap dish 133 mounted to a wall surface 116 using a mounting device 102 according to an alternate embodiment of the invention. The mounting device 102 includes a base plate 104 and a retaining member 108 removably connected to the base plate 104.

The base plate 104 includes a generally planar front surface 132 containing an internally threaded counter bore 120. A boss 118 projects from the front surface 132 of the base plate 104 adjacent the counter bore 120. The boss 118 is configured to extend through an opening 134 in the soap dish 133, thereby to facilitate mounting of the soap dish 133 on the base plate 104. Alternatively, the boss 118 may be eliminated such that the internally threaded counter bore 120 is flush with the base plate 104 front surface 132.

The retaining member 108 includes an externally threaded fastener portion 108a that threadably connects with the base plate 104 via the internally threaded counter bore 120. The retaining member 108 also includes a generally circular handle portion 108b that facilitates manual actuation of the retaining member 108 and also forms a stop that retains the mounted item—in this case, the soap dish 133—in a generally fixed position relative between the retaining member 108 and the base plate 104. It will be recognized that the soap dish 133 is intended to represent one example of what could otherwise be a wide variety of items, such as household storage items, designed to be mounted using the mounting device 102.

A stretch releasing adhesive strip 110 is affixed to the rear surface of the base plate 104 and adhesively bonds the base plate 104 to the wall surface 116. The stretch releasing adhesive strip 110 includes a non-adhesive pull tab 110a that extends downwardly below the lower edge of the base plate 104, thereby allowing a user to access the pull tab and stretch remove the adhesive strip 110 from the wall surface 116 when removal is desired. In the illustrated embodiment, when the soap dish 133 is mounted on the base plate, it overlays and generally conceals the non-adhesive pull tab 110a from view when the article is viewed from the front.

An advantage of the various embodiments of the invention is that when a user wishes to remove the mounted item (i.e. the wire-type organizer 26 shown in FIG. 6 or the soap dish 133 shown in FIG. 7) as well as the mounting device 2, 102 from a wall surface 16, 116, the disassembly of the mounting device 2, 102 is readily apparent to one viewing the device. That is, the invention provides an intuitive design that allows a user looking at the device 2, 102 to easily recognize that the mounting device 2, 102 may be taken apart by removing (e.g. by unscrewing) the retaining member 8, 108, from the base plate 4, 104 which, in turn, allows the mounted item (i.e. the wire organizer 26 or soap dish 133) to be separated from the base plate 4, 104. Once the mounted item 26, 133 is removed from the base plate 4, 104, the non-adhesive pull tab 110a of the stretch releasing adhesive 10, 110 is either revealed, as in the case of FIG. 7, or the cover plate 6 can be easily removed from the base plate 4 as in the case of FIGS. 2 and 3 to reveal the non-adhesive pull tab 10a.

Once the non-adhesive pull tab 10a 110a is uncovered and is therefore accessible to a user, the user can remove the base plate 4, 104 from the wall surface 16, 116 by pulling down on the non-adhesive pull tab 10a 110a and stretch removing the adhesive strip 10, 100 from the base plate 4, 104 and the wall surface 16, 116 to complete the removal process. In this manner, the present invention provides an intuitive design that allows users, including users who did not mount the item on the wall surface, to easily determine how to remove the mounted item 26, 133 from the device 2, 102 and how to remove the device 2, 102 from a wall surface 16, 116.

Persons of ordinary skill in the art may appreciate that various changes and modifications may be made to the invention described above without deviating from the inventive concept. Thus, the scope of the present invention should not be limited to the structures described in this application, but only by the structures described by the language of the claims and the equivalents of those structures.

What is claimed is:

1. A device for mounting an article on a target surface, comprising:

(a) a base plate having front and rear major surfaces, wherein the base plate front surface contains a channel for receiving an item that is connected to the article;

(b) a fastener for securing the base plate to the target surface; and (c) a retaining member connected with the base plate front major surface movable between an open position spaced from the base plate and a closed position adjacent the base plate and including a shaft portion and a head portion extending outwardly from the shaft portion, wherein when the item is received into the channel and the retaining member is in a closed position, at least a portion of the article extends outwardly away from the base plate beyond the head portion of the retaining member, and wherein the base plate comprises a plurality of raised abutments, that include a central abutment and at least one secondary abutment spaced from the central abutment, for maintaining the item in a fixed position relative to the abutments.

2. The device as defined in claim 1, wherein the head portion of the retaining member includes a contact surface for contacting the item as the retaining member is moved from the open position to closed position.

3. The device as defined in claim 2, wherein the retaining member is rotatably connected with the base plate.

4. The device as defined in claim 3, wherein the retaining member is threadably connected with the base plate.

5. The device as defined in claim 4, wherein the retaining member and base plate include an internally threaded counter bore and a mating externally threaded fastening member.

6. The device as defined in claim 1, wherein the retaining member includes a rib portion extending outwardly from the shaft portion arranged to retain the item on the device between the front major surface of the base plate and the retaining member, thereby securely connecting the item to the device.

7. The device as defined in claim 1, further comprising a cover plate arranged over at least a portion of the base plate.

8. The device as defined in claim 7, wherein the cover plate contains a central opening at the location where the retaining member connects with the base plate.

9. The device as defined in claim 8, wherein the cover plate snap connects with the base plate.

10. The device as defined in claim 1, wherein the base plate includes a plurality of secondary abutments arranged at regular spaced intervals around the central abutment.

11. The device as defined in claim 1, wherein the space between the central abutment and a secondary abutment is between about 2 mm and 10 mm.

12. The device as defined in claim 1, further comprising an adhesive strip arranged along the rear surface of the base plate.

13. The device as defined in claim 12, wherein the adhesive strip is a stretch releasing strip including a non-adhesive pull tab extending outwardly beyond the perimeter of the base plate, thereby to be exposed so a user can access the pull tab and stretch remove the adhesive strip when removal is desired.

14. The device as defined in claim 1, wherein the device further comprises an elongate item received into the channel of the base plate front surface, and wherein the item is securely held in the channel by the retaining member when the retaining member is in the closed position.

15. The device as defined in claim 14, wherein the elongate item protrudes, in a direction substantially parallel to the base plate front surface, beyond at least one side edge of the base plate.

16. A device for mounting an article on a target surface, comprising:

(a) a base plate having front and rear major surfaces, wherein the base plate front surface contains a channel for receiving an item that is connected to the article;

(b) a fastener for securing the base plate to the target surface; and (c) a retaining member connected with the base plate front major surface movable between an open position spaced from the base plate and a closed position adjacent the base plate and including a shaft portion and a head portion extending outwardly from the shaft portion, wherein when the item is received into the channel and the retaining member is in a closed position, at least a portion of the article extends outwardly away from the base plate beyond the head portion of the retaining member, and wherein the device further comprises a cover plate arranged over at least a portion of the base plate and that snap connects with the base plate and that contains a central opening at the location where the retaining member connects with the base plate.

17. The device as defined in claim 16, wherein the base plate includes at least one raised abutment for maintaining the item in a fixed position relative to the abutment.

18. The device as defined in claim 17, wherein the abutment includes an inclined surface.

* * * * *